UNITED STATES PATENT OFFICE.

FRIEDRICH VALENTINER, OF LEIPSIC-PLAGWITZ, GERMANY.

AROMATIC FLUORO-HYDROCARBON.

SPECIFICATION forming part of Letters Patent No. 656,229, dated August 21, 1900.

Application filed April 30, 1897. Serial No. 634,632. (Specimens.)

*To all whom it may concern:*

Be it known that I, FRIEDRICH VALENTINER, of Leipsic-Plagwitz, in the Kingdom of Saxony, in the German Empire, have invented a new and useful Process for the Production of Aromatic Fluoro-Hydrocarbons in Aqueous Solution, of which the following is a specification.

The methods known at present for the production of organic fluorin compounds are not suitable for manufacture on a large scale. Even with the best process—that proposed by Wallach—a week is required to manufacture a single kilogram of a compound of fluorin.

The process hereinafter described and claimed is extremely simple and at the same time very suitable for the production of aromatic fluoro-hydrocarbons in aqueous solution in any desired quantities.

Example: Ten kilograms of phenetidin dissolved in a solution of twenty-two kilograms of hydro-chloric acid and twenty kilograms of water are diazotized with 5.11 kilograms of sodium nitrite $NaNO_2$. The resulting solution of diazo-chlorid is dissociated with thirty kilograms of hydro-fluoric acid. The oil obtained is separated from the solution, distilled by introducing water vapor, and then fractionally distilled.

The pure product is a yellow liquid which possesses an agreeable aromatic smell, resembling that of anise.

The boiling-point of the liquid is 197° centigrade. The freezing-point is +17° centigrade.

The substance is practically insoluble in water, but is soluble in ether, alcohol, chloroform, ligroin, and fatty oils.

The chemical reaction consists of the following two phases:

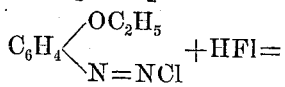

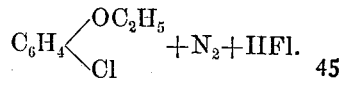

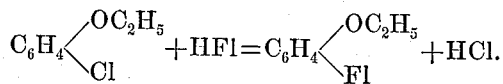

Instead of hydro-fluoric acid I may employ the salts thereof.

Having thus described my invention, I claim as new and desire to secure by Letters Patent—

The described process for the production of aromatic fluoro-hydrocarbons, which consists in treating diazo compounds with a hydro-fluoric compound.

In witness hereof I have hereunto set my hand in presence of two witnesses.

FRIEDRICH VALENTINER.

Witnesses:
 KARL HARTMANN,
 HENRY HASPER.